Patented July 20, 1948

2,445,642

UNITED STATES PATENT OFFICE 2,445,642

PLASTIC COMPOSITION COMPOSED OF A CELLULOSE COMPOUND AND AN INDANOL ESTER

Frank J. Soday, Baton Rouge, La., assignor to The United Gas Improvement Company, a corporation of Pennsylvania No Drawing. Application February 9, 1944, Serial No. 521,713

3 Claims. (Cl. 106—178)

This invention pertains to the use of one or more esters of indanols and methyl indanols, either alone or in combination with other plasticizing agents, as plasticizing agents for cellulose ester and cellulose ether and plastics.

An object of the invention is the provision of organic compounds comprising fluids which are essentially colorless and which are suitable for use alone or in combination with other substances as plasticizers in the formulation of lacquers, particularly those derived from one or more cellulosic plastics.

Other objects and advantages of the invention will be apparent to those skilled in the art from the following description.

Compounds in accordance with the formula

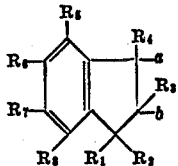

in which one of the group consisting of $a$ and $b$ is an hydroxyl group, the other being hydrogen; and $R_1$, $R_2$, $R_3$, $R_4$, $R_5$, $R_6$, $R_7$ and $R_8$ each represent hydrogen, save that any one of the said radicals $R_1$ to $R_8$ inclusive may be methyl; may be esterified with acids to give esters which are unusually stable, light in color, and possess exceptionally desirable odors.

I have discovered that esters of the indicated sort, that is esters of indanol and methyl substituted indanol are unusually desirable plasticizing agents for cellulose ester and cellulose ether plasticizing material. Such esters are produced by reaction with a carboxylic acid.

Acids which may be reacted with indanol and methyl indanols include aliphatic monobasic acids, such as formic, acetic, propionic, butyric, valeric, caproic, oenanthic, caprylic, pelargonic, capric, and similar acids having a higher number of carbon atoms; unsaturated acids, such as acrylic acid, crotonic acid, isocrotonic acid, methacrylic acid, vinylacetic acid, and the like; halogenated fatty acids, such as chloroformic acid, monochloroacetic acid, dichloroacetic acid, alpha-chloropropionic acid, and the like; hydroxy acids, such as glycollic acid, lactic acid, alpha-hydroxybutyric acid, and the like; amino acids, such as glycine, alanine, valine, leucine, and the like; dibasic acids, such as oxalic acid, malonic acid, methyl malonic acid, succinic acid, maleic acid, fumaric acid, and the like; aromatic carboxylic acids, such as benzoic acid, anthranilic acid, salicylic acid, phthalic acid, and the like; and aryl-substituted aliphatic acids, such as phenylacetic acid, hydrocinnamic acid, phenyl propionic acid, cinnamic acid, and the like.

Such esters may be regarded as having the following structural formula

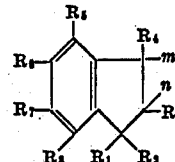

in which one of the group consisting of $m$ and $n$ is an —OOC—X group, in which X is hydrogen; alkyl, such as methyl, ethyl, propyl butyl amyl, and the like; alkenyl, such as vinyl; substituted alkyl, such as chloromethyl, hydroxymethyl, and the like; substituted alkenyl, such as methyl vinyl; aryl, such as phenyl and naphthyl; or substituted aryl, such as tolyl, xylyl, phenyl methyl, and the like; the other being hydrogen, and $R_1$ to $R_8$ has the same meaning as before.

Esters in which $R_1$ to $R_8$ are all hydrogen, or in which all are hydrogen except one, are frequently preferred.

The use of alkyl esters indanol and methyl indanols as plasticizing agents gives unusually good results in practically all cases. The acetic, propionic, butyric, and valeric acid esters of 1-indanol and 2-indanol and methyl 1-indanol and methyl 2-indanol are particularly desirable plasticizing agents for a wide variety of resinous and/or plastic materials, such as the cellulosic plastics.

Such esters may be prepared by reacting one of the group consisting of indanol and methyl indanols, or derivatives of the same containing an atom or group capable of being replaced with an ester group corresponding to the desired acid or mixture of acids, with the desired acid or anhydride, or salts or derivatives thereof.

The conversion of indene-type derivatives to indene-type alcohol esters of desired acids may be carried out in any suitable manner, and with any suitable esterification apparatus.

Any suitable esterification reagent, such as an acid, its anhydride, its salt or mixtures thereof, may be employed as desired.

For example, acetic acid or acid halides thereof may be employed for the conversion of indanols or methyl indanols to acetates, and salts of acetic acid may be used for the conversion of indanyl or methyl indanyl halides to acetates.

Illustrative of the salts of acetic acid which may be employed as esterification reagents may be mentioned sodium acetate, potassium acetate, cal-

resin produced during the separation of the light oil from the dead oil, may then be isolated by distillation under vacuum.

In the separation of lower boiling hydrocarbon material from the pitch constituents of residual tar by various methods, the oil separated may contain components boiling above 350° C. and there may be present heat polymerizable monomeric material boiling outside the range of from 210° C. and 350° C. together with the monomeric material boiling within that range. On polymerzation therefore the resin may include polymers derived from monomers boiling outside said range along with polymers derived from monomers boiling within said range.

As herein before stated, after polymerization the resin may be isolated by distillation in vacuum, which may be assisted by steam. The yield, melting point, and other characteristics of the resin will depend upon the extent to which the isolation has been carried, or, in other words, upon the proportion of associated oils left in the resin.

Exhaustive steam distillations of the resins obtained from the unsaturated monomeric material isolated from tar by the distillation or solvent extraction methods described herein have produced resins having melting points as high as from 185° C. to 200° C. and higher, cube in mercury, as determined by the method and apparatus described in A. S. T. M. Procedure D61-24, with the following modifications.

1. Mercury is employed in depth of 2½ inches instead of water.
2. The cube of resin is rigidly supported by clamping the hook upon which the resin is attached so that the top of the cube is 1 inch below the surface of the mercury.
3. A 1½ inch immersion thermometer is employed and is immersed to that depth.
4. The exact temperature at which the resin becomes visible at the surface of the mercury is recorded as the softening point of the resin.
5. The melting point of the resin is calculated from the softening point by the following formula.

Melting point °C.=
    softening point °C.×1.25+2° C.

The melting point of the resins described in this specification is intended to mean melting point as determined by the above recited method, unless otherwise specified.

Lower melting point resins may be readily obtained in greater yields by less exhaustive removal of the associated oils, thus resins ranging from very soft to hard resins having high melting points may be obtained as desired.

It has been usually found that each 6% of associated oils left in the resin lowers the melting point about 10° C.

Heat resins having melting points of 120° C. have been readily produced in yields corresponding to 20 to 30% of the dead oil in the case of the tar distillate produced in accordance with the process described in copending application Serial No. 342,735, and resins of the same melting point have been obtained in yields as high as 60% of the dead oil in the case of dead oil separated from extract produced in the process described in application Serial No. 353,034.

The heat polymerizable unsaturated monomeric material is preferably in sufficient concentration in that portion of the hydrocarbon material separated from the residual tar which boils within the range of from 210° C. to 350° C. to produce on polymerization by heat a 120° C. melting-point resin in quantity equal to at least 10 percent of the hydrocarbon material boiling within the range from 210° C. to 350° C., and preferably at least 20 percent, or higher, but lower concentrations may be employed.

The color of the resins obtained may vary from yellow to dark brown.

Heat polymer resins produced from dead oil separated from residual tar by the distillation process described in said copending application, Serial No. 342,735, have shown a tendency to be lighter in color than those produced from dead oil obtained from the solvent extraction of tar with propane and butane as described in said copending application, Serial No. 353,034. Also, heat polymer resins produced from the lower boiling portions of the dead oil have shown a tendency to be lighter in color than heat polymer resins produced from the higher boiling portions, especially such a portion as that boiling in a dead oil cut taken from 180° C. to 210° C. under a vacuum equivalent to 20 mm. of mercury, absolute.

The following examples will serve to illustrate the preparation of resins from such unsaturated fractions by thermal polymerization methods.

*Example 1*

Approximately 1000 grams of dead oil derived from the rapid distillation of oil gas tar in accordance with the process described in said copending application, Serial No. 342,735, and subsequent separation of the distillate, was weighed into a 2-liter 3-necked flask equipped with a thermometer and a short reflux condenser. The oil was then slowly stirred and heated over a Bunsen burner at a liquid temperature of 200° C. (±10° C.) for a period of 4 hours.

At the conclusion of this period, the material was allowed to cool somewhat and was then transferred for distillation to a tared 2-liter flask equipped with a ground glass neck.

The oil was accurately weighed at this point.

The flask was provided with means for measuring vapor temperatures and was connected with condensing apparatus and with means for providing a vacuum including a pressure control device. Bumping during distillation was avoided by folding several folds of iron wire to such length that one end reached slightly into the neck of the flask while the other end rested on the bottom of the flask.

The pressure was reduced to 100 mm. Hg, absolute, and head applied by means of a Bunsen burner. The distillation was continued at a pressure of 100 mm. Hg absolute, until the vapor temperature reached 180° C. During this first stage of the distillation, care should be exercised to prevent crystallization of naphthalene, if present, such as by employing a condenser operating at elevated temperatures.

When the vapor temperature reached 180° C. at a pressure of 100 mm. Hg, absolute, the flame was lowered and the pressure gradually reduced to 20 mm. Hg, absolute, using care to avoid bumping. When a pressure equivalent to 20 mm. Hg, absolute, was reached, the pressure was maintained at that value, and the distillation continued until a vapor temperature of 195° C. was reached.

During the second stage, the condenser may be cooled by cold water, but care should be taken to avoid the solidification of anthracene, if present.

plasticizable organic material selected from the group consisting of cellulose esters and cellulose ethers and a minor amount of a carboxylic acid ester of a methyl indanol sufficient to plasticize said organic material.

FRANK J. SODAY.

REFERENCES CITED

The following references are of record in the file of this patent:

UNITED STATES PATENTS

| Number | Name | Date |
|---|---|---|
| 1,975,697 | Muckenfuss | Oct. 2, 1934 |
| 2,293,775 | Soday | Aug. 25, 1942 |
| 2,378,447 | Soday | June 19, 1945 |
| 2,384,855 | Soday | Sept. 18, 1945 |

FOREIGN PATENTS

| Number | Country | Date |
|---|---|---|
| 431,565 | Great Britain | July 8, 1935 | case, the processes may be carried out consecutively without the intermediate removal of resin, or the resin may be removed between successive treatments.

The unsaturated dead oil used in the following example was obtained from petroleum tar emulsion by the process of copending application Serial Number 342,735. After separation from light oil, it was treated to remove heat polymerizable unsaturates by heating at 200° C. for 4 hours, followed by removal of the heat polymer resin formed. It was then subject to catalytic polymerization by the following method.

Example 5

A 500 gram portion of the said unsaturated dead oil was treated with 6 cc. of 66° Bé. $H_2SO_4$ according to the method described in Example 2. Naphtha was added after polymerization. Approximately 19% of the dead oil was converted to resin having a melting point of 88.2° C. and a light yellow brown color. The end temperature of the distillation for the removal of oil from the resin was 185° C., and the end pressure was equivalent to 20 mm. of mercury, absolute. A total of 407.9 grams of oil was recovered. The calculated yield of resin having a melting point of 120° C. was approximately 15%.

Examination of the monomeric unsaturated material and associated oil boiling within the range of from 210 to 350° C. described herein and the resins produced therefrom have shown that these materials are predominately aromatic.

Density determinations have indicated that the density of 25° C. of the resin obtained as above described frequently falls within the approximate range of 1.12 to 1.20, with resins produced from dead oil from the solvent extraction of tar tending to be somewhat higher than those produced from dead oil from rapid tar distillation. The densities of the acid polymers tend to be somewhat lower than those of the heat polymers derived from the same unsaturated dead oil. Resins of this type having other densities may be employed, however.

The molecular weights of the resins produced as previously described necessarily vary with the melting point, which also varies with the presence of varying quantities of associated oil among other factors. Determinations by the Benzene Freezing Point Depression method have shown that such resins usually have molecular weights ranging from 308 to 758 over a range of melting points from 80.5 to 195° C. as determined by the cube in mercury method.

The fracture of the high melting point resins described herein may range from conchoidal to hackly. In general, the polymers are quite brittle.

The resins described herein, except those hardened by exhaustive steam distillation to a very high melting point, will usually react positively to the anthraquinone reaction, indicating the presence of anthracene, unless produced from lower boiling portions of the dead oil, which do not contain anthracene, or unless the anthracene has been otherwise removed.

The resin described herein usually will give but a slight diazo reaction, indicating the substantial absence of phenols.

The resins produced as above described usually will give negative Lieberman Storch reactions, indicating the absence of rosin acids.

Upon thermal decomposition of the resins of the type produced as above described herein, appreciable yields of material boiling within the range from 210° C. to 350° C. will be produced.

The heat polymer resins of the type produced as above described usually are substantially completely soluble in carbon disulfide and benzol.

The quantity of resin insoluble in a mixture containing 50% petroleum ether and 50% pentane varies with the melting point of the resin, and may be of the order of 52% in the case of a thermal resin having a melting point of 95° C. and of the order of 80% in the case of a thermal resin having a melting point of approximately 183° C. (Cube in mercury method.)

The quantity of resin of the type produced as above described insoluble in a mixture of 50% petroleum ether and 50% pentane, but soluble in $CCl_4$, may be of the order of 50% for a thermal resin having a melting point of 95° C. and of the order of 74% in the case of a thermal resin having a melting point of 183° C. (Cube in mercury method.)

The quantity of thermal resin insoluble in both the petroleum ether-pentane solution and $CCl_4$ usually is very low, ranging from a fraction of a percent to the neighborhood of 6 or 7%.

In general, catalystic polymers are much more soluble than heat polymers from the same unsaturated dead oil in all solvents except the alcohols.

The polymers from unsaturated dead oils obtained from the rapid distillation process described in copending application, Serial No. 342,735, tend to be more soluble in those solvents tried than similarly produced polymers from unsaturated dead oils obtained by the solvent extraction process described in copending application, Serial No. 353,034.

The above described characteristics of color, density, fracture, melting point, molecular weight, diazo reaction, Lieberman Storch reaction, anthraquinone reaction, thermal decomposition, and solubility are given for the purpose of illustration. It is not intended to imply necessarily that the resin produced as described above and employed herein may not depart somewhat from this illustrative description in one particular or more.

Furthermore, the addition of other materials to the heat polymerizable monomeric unsaturated materials prior to polymerization or to the resins after polymerization may of course modify the properties of the resins produced. Examples of such materials are other synthetic or natural resins, plasticizers, softeners, fillers, coloring materials, etc.

The resin employed may comprise mixed polymers of monomeric material boiling within the range of from 210° C. to 350° C., together, if desired, with polymers of monomers boiling outside of this range, or resins may be employed which are produced from monomers boiling within a selected range or ranges within the range of from 210° C. to 350° C. for instance from separated material boiling above, say, 250° C. or, say, above 280° C.

In separating such material, the dead oil containing the monomers may be fractionated by distillation under vacuum, assisted by steam, to avoid undue polymerization during the separation, or other methods of separation may be employed.

As previously pointed out, the herein described resins, namely those obtained by the thermal and/or catalytic polymerization of the unsaturated monomeric material recovered from the tar formed during the production of gas by processes involving the pyrolytic decomposition or conversion of hydrocarbon oil, with or without the aid of catalysts, may be treated to remove certain natural drying inhibitors present by contacting (a) the resin, (b) a solution of the resin in a suitable solvent, and/or (c) the monomeric unsaturated high boiling aromatic material from which the resin is derived with an alkaline agent.

While either organic and/or inorganic alkaline agents may be employed for this purpose, I generally prefer to employ one or more inorganic alkaline agents for this purpose. Examples of suitable inorganic alkaline agents are sodium hydroxide, calcium hydroxide, calcium oxide, ammonia, potassium hydroxide, and the like. The use of sodium hydroxide is preferred.

The solid resin may be treated with the alkaline agent by (a) mixing the powdered resin with the dry alkaline agent; (b) washing and/or leaching the powdered resin with a solution of the alkaline agent in a suitable solvent, such as water; (c) treating the molten resin with the dry alkaline agent; and/or (d) treating the molten resin with a solution of the alkaline agent in a suitable solvent such as water. In the latter case, the treating process may be carried out in a closed system under pressure to retain the solvent, if desired.

After treatment, the resin may be separated from the alkaline agent, if desired, or the mixture of alkaline agent and resin may be used as such.

A preferred method of contacting the resin and the alkaline agent comprises dissolving the resin in a suitable solvent, such as a hydrocarbon solvent, followed by contacting the resin with the desired alkaline agent or solution thereof. Thus, the resin may be dissolved in xylene and treated with an aqueous solution of sodium hydroxide, the mixture being agitated in order to secure good contact between the two phases. After the treatment, the two phases may be permitted to stratify and the aqueous layer drained and discarded. The resin may then be isolated, if desired such as by distillation, which may be carried out under reduced pressure and may be assisted by the use of steam.

The resin solution prior to distillation may be treated to remove all traces of the alkaline treating agent, if desired. This may be accomplished, among other ways, by contacting the resin solution with a finely divided adsorbing agent, such as clay, activated clay, alumina, silica, or the like, followed by filtration to remove all traces of the absorbing agent. The resin then may be isolated in the usual manner, if desired.

On the other hand, the monomeric unsaturated high boiling aromatic material from which the resin is derived may be treated prior to polymerization with an alkaline agent to remove the naturally-occurring drying inhibitors present. This may be done among other ways, by agitating a mixture of the monomeric material with the desired alkaline agent, followed by stratification. The aqueous layer then may be drained and discarded. The treated monomeric material may be contacted with an adsorbent agent, such as clay or the like, in order to remove all traces of alkaline material prior to polymerization, if desired.

Any of the foregoing treating processes may be carried out at any desired temperature. In the case of resin treatment, I generally prefer to employ temperatures in the range of 30 to 200° C. When treating the monomeric material prior to polymerization, however, I generally prefer to employ temperatures between 0° C. and 100° C. and more preferably between 40° C. and 80° C. in order to prevent any substantial polymerization of monomeric material.

The quantity of treating agent employed is subject to considerable variation depending upon the results desired. Thus I may use from 1% to 30% and more preferably from 5% to 10% of alkali based upon the weight of material treated.

A combination of treating and polymerizing methods involves contacting the monomeric material with an alkaline agent, adding clay or other surface active agent and heating to form a resin from the monomeric material.

The process may be illustrated by means of the following examples.

Example 6

A resin of the type prepared in Example 1 is melted and a quantity of lime equivalent to 2% by weight of the resin is thoroughly mixed with the molten resin. The resin obtained has greatly improved drying properties.

Example 7

A resin of the type prepared in Example 1 is dissolved in xylene and washed with 10% by weight of caustic in the form of a 10% aqueous solution. After stratification, the aqueous layer is drained and discarded and the resin isolated by distillation. The treated resin possesses superior drying properties.

Example 8

A resin of the type prepared in Example 1 is dissolved in a suitable solvent and washed with an aqueous alkaline solution. After draining and discarding the alkaline solution a quantity of clay equivalent of 10% by weight of the resin is added to the resin solution, and the mixture agitated at elevated temperatures. After filtration, and distillation, a resin possessing excellent drying properties is obtained.

Example 9

High boiling monomeric unsaturated aromatic hydrocarbon material of the type employed in Example 1 is washed with 5% by weight of sodium hydroxide in the form of a 10% aqueous solution. After draining and discarding the aqueous layer, the refined monomeric material is polymerized as in Example 1. A resin possessing unusually good drying properties is obtained.

Coating compositions of the type described herein usually are prepared by incorporating the treated resin in a drying oil or bodied drying oil, followed by thinning the resulting mixture by the addition of a suitable solvent, such as a hydrocarbon solvent. Driers may be added to the mixture, as well as pigments, coloring agents, plasticizing agents, antiskinning agents, fillers, and/or other additives.

Examples of drying oils which may be employed in preparing my new coating compositions are tung oil, oiticica oil, perilla oil, dehydrated castor oil, fish oil, sardine oil, menhaden oil, linseed oil, soya bean oil, synthetic and/or modified drying oils, and the like.

Examples of thinners are hydrocarbon solvents derived from petroleum oils or cracked products, such as mineral spirits, V. M. and P. naphtha, and the like, hydrogenated and/or modified hydrocarbon solvents, coal tar solvents, such as toluol, xylol, and solvent naphtha, and similar materials.

Driers which may be used include the lead, manganese and/or cobalt salts of high molecular weight organic acids, such as metallic resinates, naphthates, oleates, and the like.

Pigments which may be incorporated in coating compositions of the type described include white lead, lead chromate, titanium oxide, red lead, zinc oxide, lithophone, chrome yellow, iron oxide, ochre, ultramarine blue, Prussian blue, lampblack, carbon black, and the like.

A preferred method of incorporating the treated resin in the drying oil comprises heating a mixture of the drying oil and treated resin to a suitable temperature for a period of time sufficient to insure the desired body. The mixture then is reduced to the desired viscosity by the addition of a suitable solvent, such as mineral spirits.

An alternative method comprises heating the drying oil, or a mixture of the drying oil and a portion of the treated resin, to the desired bodying temperature, and adding the treated resin, or the remainder of the treated resin at some stage of the bodying process. After the desired body has been attained, the mixture may be reduced by the addition of a suitable solvent.

The treated resin, or any portion of it, also may be used to check the bodying of the drying oil at any desired stage.

In addition, the treated resin may be incorporated in a previously bodied or partially bodied oil at a temperature substantially under the bodying temperature of the oil, if desired.

With respect to the oil length of the resulting coating composition, I have discovered that optimum results are secured when oil lengths under 25-gallons, and particularly under 20-gallons, are employed. Excellent results are secured in practically all cases when coating compositions having oil lengths of 15-gallons, or less, are employed.

Thus, for example, coating compositions possessing unusually desirable properties are obtained from linseed oil and a treated resin of the type described herein when such compositions have an oil length of from 6 to 10-gallons.

In a similar manner, excellent results have been obtained with both perilla oil and fish oils when the resulting coating compositions have an oil length of 15-gallons, or less.

At higher oil lengths, the coating compositions may be slightly unstable. This is usually manifested by the precipitation of a portion of the resin from the coating composition during storage.

The foregoing preferred oil lengths pertain particularly to coating compositions in which petroleum hydrocarbon fractions such as mineral spirits or V. M. and P. naphtha, have been employed as solvents. In case a coal tar solvent, or mixture of coal tar solvent and petroleum hydrocarbon fraction, is used as the solvent, the indicated oil lengths can be increased substantially without seriously impairing the properties of the resulting coating compositions.

The oil lengths discussed in the foregoing paragraphs refer to the number of gallons of drying oil employed for each hundred pounds of treated resin.

The incorporation of a treated resin of the type described herein in a typical 15-gallon varnish is illustrated by the following example.

*Example 10*

A mixture of the treated resin and linseed oil is heated to a temperature of 580° F., after which it is held at this temperature for a period of one hour. The varnish then is reduced to 50% solids by the addition of mineral spirits.

A quantity of cobalt and lead naphthenates equivalent to 0.6% lead and 0.2% cobalt, expressed in terms of the respective metals as a percentage of the drying oil present, is added to the varnish when it reaches room temperature. A varnish having excellent drying properties is obtained.

Coating compositions of this type may be used as such for application to a wide variety of surfaces, or they may be modified by the addition of other ingredients before application.

Thus, for example, pigments may be incorporated in the varnish obtained in Example 10 by blending or mixing in a suitable mill or other device, such as a ball mill or a roller mill. The incorporation of pigments in such coating compositions is greatly facilitated by the exceptional wetting and dispersing properties of the treated resins of the type described herein, resulting in a marked decrease in the time required to produce a given enamel.

Lesser quantities of other resins may be incorporated in the coating compositions of the type described, if desired. In general, however, I prefer to employ treated resins of the type described herein as the sole resinous ingredient of the coating composition.

The excellent durability of coating compositions prepared from treated resins of the type described herein is illustrated by the following example:

*Example 11*

A 15-gallon perilla oil varnish prepared from the resin obtained in Example 1 had a drying time of 20 hours. A similar varnish prepared from the treated resin obtained as in Example 6 had a drying time of only 6–7 hours.

To summarize, the hydrocarbon polymers or resins to which this invention relates may be characterized as follows:

(1) The polymers or resins are comprised of carbon and hydrogen in chemical combination to at least 98% and more particularly, to at least 99%, other elements such as oxygen, nitrogen and/or sulfur derived from the oil pyrolyzed, if present, being restricted to less than 2%, and more particularly to less than 1%.

(2) The polymers or resins are substantially completely soluble in an excess of benzene, the proportion of insoluble material being less than 1%, and more particularly, less than 0.1% of the polymer or resin.

(3) The polymers or resins have an ash content determined by burning of less than 1%, and more particularly, of less than 0.1%.

(4) Upon subjecting the polymers or resins to destructive distillation under vacuum to effect depolymerization, that portion of the oily material recovered as overhead which boils above 200° C. has a refractivity intercept of at least 1.08 and particularly of at least 1.09 and still more particularly, of at least 1.10.

(5) Polymers or resins hardened by distilling to an overhead temperature between approximately 190 to 200° C. at 20 mm. Hg absolute pressure in accordance with the procedure of Example I have the following characteristics:

(a) They have A. S. T. M. ball and ring softening points of at least 40° C. and more particularly of at least 80° C. For example, typical polymers or resins polymerized by surface active agents such as clay, as catalysts, have A. S. T. M. ball and ring softening points of at least 40° C., such as between 60° C. and 80° C. or above, and typical polymers or resins polymerized by heat, or with acid or acid-acting catalysts, have A. S. T. M. ball and ring softening points of at least 80° C., such as between 90° and 110° C. and higher, such as up to 120° C. or above.

(b) They have densities of at least 1.10 and up to 1.20 and higher, such as between 1.13 and 1.18, as determined by the water displacement method.

(c) They have molecular weights between 300 and 1000 as determined by the freezing point depression method employing benzene as the solvent.

(d) They have a solubility in an equal quantity by weight of toluene at a temperature of 20° C. of at least 30 grams, and preferably of at least 50 grams, in 100 grams of toluene.

(e) One part of the polymers or resins when dissolved in three parts by weight of benzene having a density ($d_{20}^4$) of 0.8790 and a refractivity intercept of 1.0623, makes four parts of a solution having a density greater than 0.925 and a refractivity intercept greater than 1.069. Neglecting any possible change that may occur in the solid when it is dissolved, calculated values for the polymers or resins themselves, that is, apart from the solvent, (densities and refractivity intercepts being additive on a volume basis) become for densities at least 1.10, and for refractivity intercepts at least 1.08, and particularly, at least 1.09, and still more particularly, at least 1.10.

(6) The oils from which the polymers or resins are polymerized have mixed aniline points below 15° C., and more particularly, below 10° C., for example, between 10 and 4° C. and lower. A mixed aniline point of a given oil is defined as the critical solution temperature of a mixture of 10 cc. of anhydrous aniline, 5 cc. of the oil being tested and 5 cc. of a petroleum naphtha having an aniline point of 60° C. as determined by A. S. T. M. tentative standard D611–41T.

(7) The oils from which the polymers or resins are polymerized usually having refractivity intercepts of not less than 1.08, for example, between 1.09 and 1.11, and higher, such as, up to 1.125 or 1.135.

(8) The oils from which the polymers or resins are polymerized contain at least 90%, such as not less than 95%, and more particularly not less than 97% of aromatic hydrocarbons.

(9) The oils from which the polymers or resins are polymerized have densities of not less than 0.95, and, more particularly, of not less than 0.98, for example, between 0.99 and 1.02, and higher, such as up to 1.11 or 1.12.

(10) Liquid material extracted from the polymers or resins using a large excess of pentane has refractivity intercepts of at least 1.08 and more particularly, of at least 1.09, and still more particularly, of at least 1.10.

(11) The oil separated from the polymers or resins after polymerization usually has a density of not less than 0.95 and, more particularly, of not less than 0.98, for example, between 0.99 and 1.02 and higher, such as up to 1.11 or 1.12. Such oils separated from the polymers or resins after polymerization also usually have refractivity intercepts of not less than 1.08, for example, between 1.09 and 1.11, and higher, such as up to 1.125 or 1.135, and contain at least 90%, such as at least 95%, and more particularly, at least 97% aromatic hydrocarbons.

(12) Refractivity intercept when referred to herein is determined by the method described in the Science of Petroleum (1938), vol. 2, beginning on page 1175, and publications referred to therein.

In the specification and in the claims, the term "treated resin" is intended to mean a resin of the type described herein, the said resin and/or the monomeric material from which it is prepared having been treated with an alkaline agent to remove drying inhibitors.

While various procedures and formulas have been particularly described these are of course subject to considerable variation. Therefore, it will be understood that the foregoing specific examples are given by way of illustration, and that changes, omissions, additions, substitutions and/or modifications might be made within the scope of claims without departing from the spirit of the invention, which is intended to be limited only as required by the prior art.

I claim:

1. A process of removing drying inhibitors naturally present in one of a group consisting of a hydrocarbon oil containing polymerizable hydrocarbons and a solution of hydrocarbon resin polymer selected from the group consisting of heat resin polymer and catalytic polymer of said polymerizable hydrocarbons contained in said hydrocarbon oil, said hydrocarbon oil having been physically separated from tar produced in the vapor phase pyrolysis of petroleum oil and being free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., which comprises reacting one of the said group of hydrocarbon materials with 1% to 30% of an inorganic alkali in aqueous solution at a temperature within the range of 0° C. to 200° C., and freeing the so treated hydrocarbon material from alkali by stratification, drainage and absorption.

2. A process of removing drying inhibitors naturally present in a hydrocarbon resin consisting of hydrocarbon polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., which comprises dissolving the said hydrocarbon resin in a solvent therefor, reacting the said resin in solution with 1% to 30% of an inorganic alkali in aqueous solution at a temperature within the range of 30° C. to 200° C., and freeing the so treated hydrocarbon resin from alkali by stratification, drainage and absorption.

3. A process of removing drying inhibitors naturally present prior to polymerization in a hydrocarbon oil which has been physically separated from tar produced in the vapor phase pyrolysis of petroleum oil and which is free from and of greater volatility than the pitch of said tar, said hydrocarbon oil containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., which comprises reacting the said hydrocarbon oil with 1% to 30% of an inorganic alkali in aqueous solution at a temperature within the range of 0° C. to 100° C., and freeing the so treated hydrocarbon oil from alkali by stratification, drainage, and absorption.

4. As a new composition of matter a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin producing catalyst, other hydrocarbons boiling between 210° C. and 350° C. which are polymerizable to catalytic resin polymer by treating said oil with a resin producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., the properties of the said hydrocarbon resin polymer for inclusion in coating compositions having been improved by the removal of drying inhibitors naturally present in one of a group consisting of a solution of the said hydrocarbon resin polymer and the said hydrocarbon oil containing the aforesaid hydrocarbons polymerizable to the said hydrocarbon resin polymer in yet unpolymerized condition by a treatment which comprises reacting one of the said group of hydrocarbon materials with 1% to 30% of an inorganic alkali in aqueous solution at a temperature within the range of 0° C. to 200° C., and freeing the so treated hydrocarbon material from alkali by stratification, drainage and absorption.

5. A coating composition comprising a drying oil and a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin producing catalyst, other hydrocarbons boiling between 210° C. and 350° C. which are polymerizable to catalytic resin polymer by treating said oil with a resin producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., the properties of the said hydrocarbon resin polymer for inclusion in coating compositions having been improved by the removal of drying inhibitors naturally present in one of a group consisting of a solution of the said hydrocarbon resin polymer and the said hydrocarbon oil containing the aforesaid hydrocarbons polymerizable to the said hydrocarbon resin polymer in yet unpolymerized condition by a treatment which comprises reacting one of the said group of hydrocarbon materials with 1% to 30% of an inorganic alkali in aqueous solution at a temperature within the range of 0° C. to 200° C., and freeing the so treated hydrocarbon material from alkali by stratification, drainage and absorption, the proportion of drying oil to resin polymer being such as to produce a coating composition having an oil length of less than 25 gallons.

6. As a new composition of matter a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin producing catalyst, other hydrocarbons boiling between 210° C. and 350° C. which are polymerizable to catalytic resin polymer by treating said oil with a resin producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., the properties of the said hydrocarbon resin polymer for inclusion in coating compositions having been improved by the removal of drying inhibitors naturally present in the said hydrocarbon oil containing the aforesaid hydrocarbons polymerizable to the said hydrocarbon resin polymer in yet unpolymerized condition by a treatment which comprises reacting the said hydrocarbon oil with 1% to 30% of an inorganic alkali in aqueous solution at a temperature within the range of 0° C. to 100° C. and freeing the so treated hydrocarbon oil from alkali by stratification, drainage and absorption.

7. As a new composition of matter a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin producing catalyst, other hydrocarbons boiling between 210° C. and 350° C. which are polymerizable to catalytic resin polymer by treating said oil with a resin producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., the properties of the said hydrocarbon resin polymer for inclusion in coating compositions having been improved by the removal of drying inhibitors naturally present therewith which comprises dissolving the said hydrocarbon resin in a solvent therefor, reacting the said resin in solution with 1% to 30% of an inorganic alkali in aqueous solution at a temperature within the range of 30° C. to 200° C., and freeing the so treated hydrocarbon material from alkali by stratification, drainage and absorption.

FRANK J. SODAY.

REFERENCES CITED

The following references are of record in the file of this patent:

UNITED STATES PATENTS

| Number | Name | Date |
|---|---|---|
| 2,052,173 | Frolich et al. | Aug. 25, 1936 |
| 2,150,641 | Thomas et al. | Mar. 14, 1939 |